June 27, 1950      C. E. BIXLER      2,512,997

INTEGRAL BRUSH ASSEMBLY

Filed Nov. 12, 1947      2 Sheets-Sheet 2

INVENTOR
CARL E. BIXLER
BY
Pennie, Edmonds, Morton and Barrows
ATTORNEYS

Patented June 27, 1950

2,512,997

UNITED STATES PATENT OFFICE 2,512,997

INTEGRAL BRUSH ASSEMBLY

Carl E. Bixler, Prospect, Ky., assignor to Devoe & Raynolds Company, Inc., Louisville, Ky., a corporation of New York Application November 12, 1947, Serial No. 785,388

18 Claims. (Cl. 15—193)

This invention relates to improvements in the manufacture of brushes, particularly paint brushes, and includes new and improved brushes with integral brush assembly, made with an epoxide bonding composition, and an improved method of making such brushes.

As is well known to those familiar with the art, brushes have a number of uses and come in contact with many different materials. Necessarily, then, they must be substantially inert to the action of materials with which they are in contact. This is particularly pronounced in regard to paint brushes and the like. Such brushes are used to apply paint compositions of various types and, following use, should be cleaned to prolong their useful life. The several brush elements—as the bristles, bonding composition, plugs or dividers, ferrule and handle—are thus subject during use and cleaning to the action of inorganic and organic materials and, in particular, organic solvents and water. On continued use, the action of organic solvents and water tends to cause the bristles to become free from the bonding composition and fall from the brush. Similarly, wooden plugs or dividers hitherto used to space the bristles, and not waterproofed, may swell considerably when in contact with water and oxygen-containing organic solvents and thereafter contract when dry. As a result, the plugs or dividers may become loose in the ferrule.

Rubber setting compositions have been widely used as bonding materials to secure the basal ends of the bristles. Here again, however, weakness is introduced into the brush assembly. Upon curing of the rubber setting composition, a "honeycomb" effect may result; that is, the cured bonding composition is characterized by a great number of voids, caused by non-uniform release of volatile material from the original rubber setting composition. With such a "honeycomb" effect, many of the bristles are but loosely held in the ferrule and fall from the brush when the latter is used. To avoid this difficulty, it has generally been the practice to use a longer bristle than would be required with uniform bonding; with a longer bristle, there is greater opportunity for the bristle to be secured in the bonding composition. It will be readily recognized, however, that this is a relatively expensive practice. A further undesirable feature of rubber setting composition is the high temperature (140–150° C.) required for curing. At such temperatures, maintained for extended time periods as 6–12 hours, some deterioration of protein bristle results. In some instances, protein bristle cracks during the curing operation. When the brush is used thereafter, such bristles are easily broken and fall from the brush.

All of the foregoing undesirable features have given rise to considerable investigation directed to improving one or more of the various elements of the brush assembly. Until now, such investigations have, so far as I am aware, been unrewarding. Now, however, it has been discovered that a new and novel class of epoxide-containing compositions are unusually well adapted for use as bonding compositions, and also as plugs or dividers, for brushes and, particularly, for paint brushes. The epoxide-containing compositions used for the bonding composition or cement combines chemically with the epoxide-containing plugs or dividers. Further, the epoxide-containing compositions combine chemically with protein bristle and with synthetic bristles containing reactive groups such as amino, amido, hydroxyl, carboxyl, sulfhydryl, etc. With the combination of the novel epoxide bonding composition, epoxide resin plugs and bristle, the brush assembly is, in fact, an integrated assembly and, as such, is free from the several shortcomings mentioned above.

The invention will be more apparent from the following description with reference being made to the accompanying drawings:

Fig. 1 shows a front view of a paint brush with a portion of the ferrule broken away;

Fig. 2 also shows a front view of a modified form of paint brush with a portion of the handle broken away;

Figure 1:
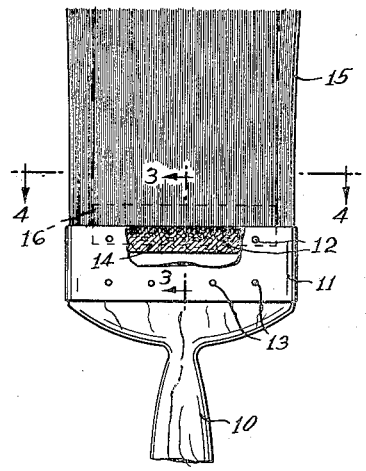

In Fig. 1, the numeral 10 indicates the handle of the brush and 11 the ferrule. Rivets 12 are inserted in one side of the ferrule through holes drilled in the bonding composition and ferrule to bind the brush assembly in the ferrule. Nails 13 are driven from opposite sides of the ferrule 11, through the ferrule, and into the handle 10 to fasten the ferrule to the handle. The butt ends of the bristles 15 are anchored in the bonding composition 14.

Figure 2:
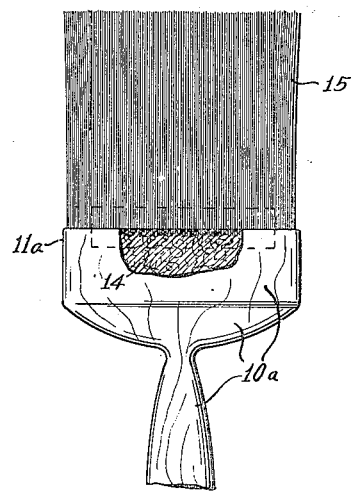

Fig. 2 represents a front view of a modified form paint brush with a portion of the handle 10a broken away. There is no ferrule in this brush; the section of the brush generally identified as a ferrule 11a is here a part of the handle. There are no rivets or nails in this brush. The bonding composition and bristles are again identified by the numerals 14 and 15, respectively.

Figure 3:
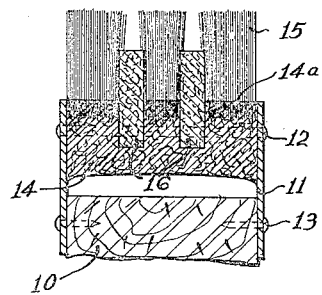
Fig. 3 is an enlarged vertical section, taken on the line 3—3 of Fig. 1.
Figure 4:
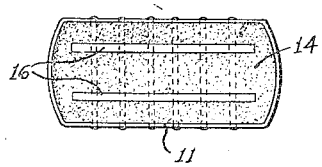
Fig. 4 is a section taken on the line 4—4 of Fig. 1.

As indicated above, Fig. 3 represents an enlarged vertical section of the brush shown by Fig. 1. In this figure, the brush assembly is shown in greater detail, with the numeral 14a indicating the area in which the bonding composition 14, bristles 15 and plugs or dividers 16 come together to form a unitary system. Fig. 4 is a section taken on the line 4—4 of Fig. 1, and shows the plugs or dividers 16 embedded in the bonding composition 14.

Figure 5:
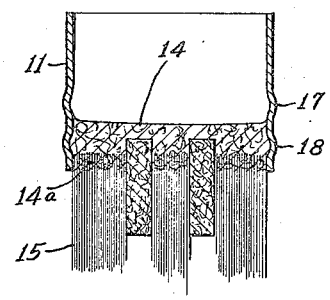
Fig. 5 is a sectional view similar to that of Fig. 3 illustrating a standard type of ferrule and an intermediate stage in the manufacture of the brushes.

Fig. 5 shows a stage in the manufacture of a brush with the assembled bristles and plugs inserted in a standard type beaded ferrule 11 having a bead 17 and a second bead 18 adjacent to the area 14a.

Figure 6:
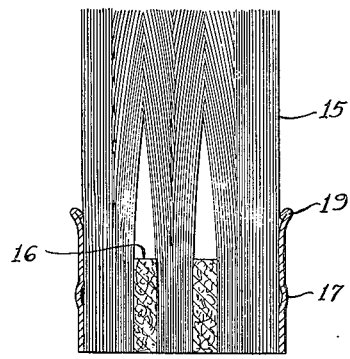
Fig. 6 is a sectional view showing a modified form of ferrule and showing a preliminary stage in the manufacture of the brushes.

Fig. 6 shows a preliminary stage in the manufacture of a brush, with the assembled bristles 15 and plugs 16 inserted in a modified form of ferrule 11 having a bead 17 and a hemmed edge 19.

Figure 7:
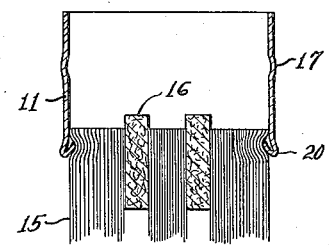
Fig. 7 shows another form of ferrule and an intermediate stage in the manufacture of the brushes.

Fig. 7 shows a ferrule 11 with bead 17 and hemmed and rolled edge 20 and shows the location of the bristles and plugs just before the liquid epoxide bonding composition is added.

Figure 8:
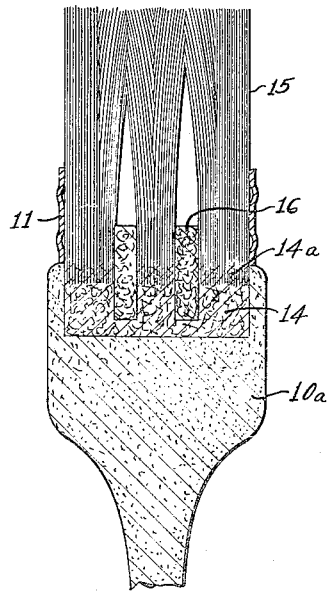
Fig. 8 is an enlarged sectional view of the brush of Fig. 2 and illustrating a step or stage in the manufacture of the brush.

Fig. 8 also illustrated a stage in the manufacture of the brush, with the assembled bristles and plugs or dividers held by the ferrule 11, which is subsequently removed, and showing the initial epoxide bonding composition 14 at the stage at which the assembled bristles and plugs are inserted in the brush handle, with the bonding composition therein. This figure also shows the arrangement of the parts during the curing or hardening operation for converting the bonding composition into its final form.

Figure 9:
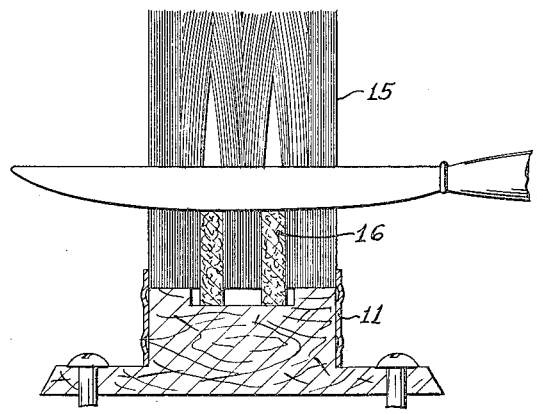
Fig. 9 is a sectional view illustrating a step or stage in the manufacture of the brushes.

Fig. 9 illustrated an operation of locating the bristles and plugs in position in the ferrule preparatory to adding the bonding compositions.

The nature of the bonding compositions and of the plugs, ferrules, handles, etc., and the procedure of process for making and assembling the brushes, will further appear from the following more detailed description.

BONDING COMPOSITION

As indicated above, the bonding compositions 14 of brushes of the aforesaid type are epoxide-containing compositions. More specifically, these compositions comprise a phenol, and two epoxide-containing components. One epoxide-containing component is a liquid or low melting point polyepoxide, such as a simple polyepoxide typified by butane dioxide, or preferably is a more complex liquid polyepoxide formed by reaction of a polyhydric compound with an epihalohydrin followed by dehydrohalogenation. For convenience in referring to this first-mentioned epoxide component, the material is designated by the symbol (A). The second epoxide-characterized component, conveniently designated (B), is a resinous ether epoxide prepared by reaction of an epihalohydrin with a polyhydric phenol in an alkaline medium, and has a melting or softening point not greater than about 65° C., and preferably greater than the melting point of the polyepoxide (A). Each of these epoxide-containing components is described more fully hereinbelow. For convenience also, the phenol used in combination with the aforesaid epoxides, (A) and (B), is designated herein by the symbol (C).

The proportions of the polyepoxide (A), resinous epoxide (B) and phenol (C), fall within well-defined ranges in the formation of the bonding compositions. One part by weight of polyepoxide (A) is used with from about ⅔ part to about 3 parts by weight of resinous epoxide (B); preferred, however, are those compositions in which one part by weight of epoxide (A) is used with from about 1 part to about 1½ parts by weight of resinous epoxide (B). From about $\frac{1}{10}$ to about ⅓ part by weight of phenol (C) is used with one part of the epoxide composition A+B, wherein the epoxides (A) and (B) are present in the proportions previously indicated. Particularly outstanding compositions are obtained when the dihydric phenol, such as bis phenol A, is used in the amount of about 15 parts by weight, in combination with about 45 parts of liquid polyepoxide (A) and with about 40 parts of resinous epoxide (B).

Before describing in detail each of the epoxy-characterized components, it should be understood that the terms "epoxide," "polyepoxide," "epoxy" and the like are used in the specification and in the appended claims to denote compounds having an ether oxygen atom joined to two vicinal carbon atoms. Representative of such terms are the epoxy or cyclic ether groups present in epichlorhydrin and butane dioxide (that is, 1-2-epoxy-3-4-epoxy butane).

(1) Polyepoxide (A)

As indicated hereinabove, one of the epoxide components is a simple polyepoxide or a complex polyepoxide having a relatively low melting point or softening point below about 40° C. and preferably below 20° C. Examples of simple liquid polyepoxides are butane dioxide, bis-(2,3-epoxy propyl) ether (or diglycid ether), isoprene dioxide, hexadiene dioxides, limonene dioxide, etc. Two or more of such simple polyepoxides may be used in conjunction with the resinous epoxide (B) and the phenol (C).

The complex polyepoxides referred to above are those obtained by reaction of an epihalohydrin, particularly an alpha-epihalohydrin, with a polyhydric alcohol, followed by dehydrohalogenation of the halohydrin composition formed by reaction of said epihalohydrin and polyhydric alcohol. Reaction of the epihalohydrin and polyhydric compound, preferably a polyhydric alcohol, is carried out in the presence of a suitable catalyst, of the type described below, and a halohydrin or mixture of halohydrins is formed. Thereafter, the halohydrin composition is dehydrohalogenated with an alkaline agent, of the type illustrated below, whereupon a polyepoxide or polyepoxide composition of low melting point or softening point is formed. These compositions generally contain a small amount of halogen in relatively unreactive form, particularly halogen attached to a carbon atom which is not attached to a carbinol group.

Polyhydric alcohols which may be used for the preparation of the complex liquid polyepoxides are illustrated by the following:

Ethylene glycol
Propylene glycol
Trimethylene glycol
2,3-butanediol
Di-ethylene glycol
1,12 dihydroxy octadecane
2,2-dimethyl-1, 3-propanediol
Glycerol
Diglcerol
Triglycerol
Trimethylol propane
Erythritol Pentaerythritol } particularly when used in combination with ethylene
Di-pentaerythritol } oxide, ethylene glycol, glycerol and the like.

Mannitol
Dextrose
Polyallyl alcohol
Condensates of ethylene oxide and polyhydric alcohols In some cases, products obtained from certain of the foregoing polyhydric reactants may be somewhat more viscous than desired for use in the preferred compositions. In such cases, less viscous fractions may be isolated from the reaction product by distillation, solvent precipitation or other suitable procedures.

Epihalohydrins used in preparing the aforesaid complex polyepoxides have the general formula

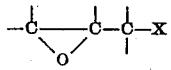

wherein X is a halogen atom, such as chlorine, bromine and iodine. Typical epihalohydrins are epichlorhydrin, epibromhydrin and epiiodohydrin. The latter materials are all characterized by a three-carbon chain; however, analogs of the aforesaid epihalohydrins may also be used. Examples of the latter are beta-methyl epichlorhydrin and gammamethyl epichlorhydrin. It will be noted that epifluorhydrin and its analogs are not referred to above. Inasmuch as fluorine is rather unreactive in such epoxy compounds, the latter are not contemplated herein. Accordingly, the term "epihalohydrin" as used herein in connection with the complex epoxies (A) defines compounds in which the halogen is chlorine, bromine and iodine, and is exclusive of fluorine. In view of its availability and relatively low cost, epichlorhydrin is preferred.

As aforesaid, catalysts are used in reacting an epihalohydrin with a polyhydric compound, for the formation of a halohydrin or halohydrin-containing composition. Typical catalysts are those of the Friedel-Crafts type, including $AlCl_3$, $BF_3$, $ZnCl_2$, $FeCl_3$, $SnCl_4$ and complexes thereof such as the well known $BF_3$ etherates, etc.; acid type catalysts including HF, $H_2SO_4$, etc.; $CbCl_5$, etc.

In the formation of the halohydrins from epihalohydrins and polyhydric alcohols, for example, it is preferred that one molecule of epihalohydrin be used for each hydroxyl group of the polyhydric alcohol. While this is the preferred relationship, it is possible, however, to vary the proportions widely and yet obtain satisfactory halohydrin compositions which, upon dehydrohalogenation, provide suitable polyepoxides.

The halohydrin compositions described above are dehydrohalogenated with a suitable alkaline material, preferably in the presence of an organic solvent. Alkaline materials which may be used are illustrated by NaOH, KOH, $Ca(OH)_2$, and alkali metal aluminates, silicates and zincates. Organic solvents advantageously used in this treatment are water-miscible, such as dioxane, acetone, methyl ethyl ketone, etc. Temperatures for the dehydrohalogenation are of the order of about 0° C. to about 100° C.

Further details of the character of these complex polyepoxides (A) and of the preparation thereof are provided in application Serial No. 754,080, filed June 11, 1947, of J. D. Zech. The complex polyepoxides (A) and the preparation thereof are illustrated in the typical examples presented hereinbelow.

It is to be understood that two or more complex polyepoxides (A) may be used together, or in admixture with one or more simple liquid polyepoxides, the total quantity of such polyepoxides (A) falling within the ranges recited above.

(2) *Epoxides of epihalohydrins and polyhydric phenols (B)*

As indicated above, the second epoxide-characterized component (B) of the compositions contemplated herein is one prepared by reaction of an epihalohydrin, particularly an alpha-epihalohydrin, with a polyhydric phenol, the latter being in the form of its corresponding metal salt. The epoxide resin component is further characterized by a melting point or softening point (Durran's Mercury Method) of not greater than about 65° C. In addition to an epoxide group or groups, this component also contains ether linkages and hydroxy groups.

The foregoing resinous epoxide components (B) may also be identified by their epoxy equivalent. In general, the epoxy equivalent will be from about 110 to 500. The epoxide group content is determined by measuring the equivalent weight of the composition per epoxide group. The method used involves heating one gram sample of the epoxide composition with an excess of pyridine containing pyridine hydrochloride, at the boiling point for 20 minutes, and back titrating the excess pyridine hydrochloride with 0.1 normal sodium hydroxide, using phenolphthalein as indicator. One HCl is considered equivalent to one epoxide group. The pryidine-pyridine hydrochloride solution is made by adding 16 ccs. of concentrated hydrochloric acid per liter of pyridine.

The epihalohydrin-polyhydric phenol reaction products are preferably prepared by reacting about one mol of epihalohydrin for each hydroxyl group of the polyhydric phenol. For example, if a dihydric phenol is used, about two (2) mols of an epihalohydrin are used with about one (1) mol of dihydric phenol. Caustic alkali is used in the reaction in amounts sufficient to combine with the halogen of the epihalohydrin reactant; preferably, an excess of alkali is used to insure substantially complete removal of halogen. It will be understood that other strong aqueous alkalies may also be used; for example, potassium and lithium hydroxides.

While epichlorhydrin is the preferred epihalohydrin for these epoxide compositions (B), homologs thereof may be used advantageously. For example, epibromhydrin may be used. As indicated above, however, in connection with the liquid epoxide compositions (A), prepared from epihalohydrins followed by dehydrohalogenation, the epifluorhydrins are not contemplated in view of the low degree of reactivity of the fluorine in such compounds.

Polyhydric phenols used in the preparation of these epoxide compositions (B) are typified by resorcinol; hydroquinone; bis phenols, such as bis phenol A, predominantly 4-4'-dihydroxy-diphenyl dimethyl methane, with lesser quantities of the 2,2- and 4,2'-isomers present. Preferred polyhydric phenols are dihydric phenols whose mono alkali metal salts have a pH from about 7 to 11; examples of such dihydric phenols are those recited above. Particularly preferred, however, is bis phenol A.

In the preparation of the resinous polymeric epoxides (B), the aqueous alkali, bis phenol and epichlorhydrin, for example, are advantageously added together at the outset. In such a procedure, the aqueous alkali serves to dissolve the bis phenol, with the formation of the corresponding monophenoxide and diphenoxide alkali salts. Alternatively, the alkali and bis phenol may be admixed, and the epichlorhydrin added thereto; or, an aqueous solution of alkali and bis phenol may be added to the epichlorhydrin. Reaction takes place with the evolution of heat, which serves to further the reaction. The rise in temperature of the reactants may be controlled by regulating the amount of water used in the form of aqueous akali. Also, the temperature may be controlled by circulating a suitable heat transfer medium about the exterior walls of the vessel or apparatus in which the reaction takes place. Such means are well known in the art. Heat is applied to complete the reaction, the temperature generally being maintained at about 80–110° C. for a sufficient length of time. Depending upon the quantities of reactants used and the temperature of reaction, the time required for complete reaction generally varies from about thirty minutes to three hours or more. The reaction conditions are illustrated by the typical examples set forth hereinafter.

As the reaction proceeds, the reaction mixture separates into an upper aqueous layer which is drawn off and the residue, generally of taffy-like consistency, settles to the bottom of the reaction vessel. The residue is then washed with hot water, continuously or intermittently, for a short period of time. The residue and hot water are agitated thoroughly. The wash water is drawn off. The washing procedure may be repeated several times, as necessary, to effect removal of any unreacted alkali and the by-product sodium chloride, for example. Dilute acids, such as acetic or hydrochloric, may be used to neutralize excess alkali during the washing procedure. It is usually desirable to wash the product entirely free from alkali and salt, inasmuch as unreacted alkali or basic salts such as sodium acetate, may induce further polymerization during the drying process, when heat is applied to remove the final traces of water. The wet product or resin may be dried by heating and stirring until the temperature rises substantially above the boiling point of water, or by other suitable means.

While certain organic solvents may be used instead of water in the preparation of the resinous epoxides, the use of water is preferred. When organic solvents, in which the reaction product is soluble, are used, the reaction product can be freed from salts in some cases by filtration and the product then recovered by distillation of the solvent. In the case of products which are soluble or partially soluble in hot water, in which the by-product salt is also soluble, an organic solvent may be used advantageously; in such case, the product can be recovered from the aqueous layer by extraction. When an organic solvent is used it should be one which does not react with the reactants or reaction products.

Further examples of resinous epoxides (B) which may be used are those described in application Serial No. 621,856, filed October 11, 1945, and whose melting points are not greater than about 65° C.

Once again, it is to be understood that two or more resinous epoxides (B) of the character defined above, may be used with the aforementioned polyepoxides (A) and phenols (C). In such case, the total quantity of resinous epoxides (B) will come within the ranges defined above.

(3) Phenols (C)

A phenol, or mixture of the same, is used in combination with the aforesaid epoxides (A) and (B), in the proportions noted above. Illustrative of the phenols which may be used advantageously are phenol; cresols, resorcinol; hydroquinone: catechol; bis phenols, such as bis phenol A and dichlor bis phenol A. Preferred, however, are polyhydric phenols such as recited above. Particularly preferred are bis phenol A and its dichlor analog.

It should be clear from the foregoing that two or more of said phenols (C) may be used in admixture with the aforesaid components (A) and (B). The quantity of the phenols (C), in such case, will be within the ranges set forth above.

(4) Converting catalysts

When the aforesaid epoxide components, (A) and (B), and a phenol (C) are treated with a suitable catalyst, water-insoluble, high melting, infusible products are formed. Thus, the bonding composition described above is converted with such a catalyst to a particularly valuable brush cement. The infusible products are complex polymeric ether materials, apparently formed by direct addition of epoxy and hydroxyl groups. Converting catalysts useful here include alkalies, such as sodium and potassium hydoxides; alkali phenoxides, for example, sodium phenoxide; acids such as phosphoric acid, partial esters of phosphoric acid such as diethylortho phosphate and hexaethyl tetraphosphate; polyfunctional aliphatic amines typified by diethylene triamine, triethylene tetramine, etc.; Friedel-Crafts type such as $AlCl_3$, $ZnCl_2$, $FeCl_3$, $BF_3$ and complexes thereof, including ethers, acid anhydrides, amines, amides, sulfides, diazonium salts, etc. For the purpose of bonding natural bristles, alone or with other bristles, the aliphatic amines have not proven as satisfactory as other converting catalysts, such as the alkalies, due to their degrading effect upon natural bristle.

The concentration of converting catalyst is generally of the order of less than one percent to about 10 percent (based on the total weight of the composition) and varies with individual catalysts. For example, satisfactory results have been obtained with from 2 to 4 percent (solid) potassium hydroxide, in the form of a 50 percent solution. Alkali phenoxides are also used, in general, in amounts of the order of 2 to 4 percent. Aliphatic amines are preferably used in amounts from about 5 to 10 percent. Friedel-Crafts type catalysts provide satisfactory conversion when used in amount of 1–10 percent.

(5) *Preparation of bonding material*

The foregoing components—(A), (B) and (C)—may be combined in any one of a number of ways to form the bonding material for use in brushes. For example, the epoxides (A) and (B), and a phenol may be thoroughly admixed in the proportions indicated above and a converting catalyst added thereto at a suitable temperature, prior to use in the brush assembly. One particularly advantageous procedure involves thorough admixture of the epoxides and phenol, with a catalyst at a temperature of the order of 0° C. to about 20° C. In this way a uniform distribution of the catalyst throughout the composition is obtained and premature polymerization or conversion of the composition is minimized. When aqueous alkali is used as the catalyst, it is preferred that the catalyst composition be allowed to stand at 20–40° C. for several hours, as 8–16 hours, to avoid foaming of the composition when the latter is heated. When the composition is used during the brush making operation, the composition is run into the ferrule and the temperature is raised, as to 30° C. or to about 120° C. Polymerization or conversion proceeds with the formation of the desired infusible, water-insoluble bonding material.

Conversion of the epoxide composition is complete, for example, in about 4 hours at 110° C. This is in direct contrast with similar conversion of a rubber setting composition, which generally requires about 12 hours at 140° C. In the latter instance, appreciable degradation of the bristles occurs, with the bristles losing elongation. This is shown by an elongation test wherein a Schopper Paper Tester is used. The test involves fixing the butt end of a bristle in the movable chuck of said tester and securing the bristle in the stationary chuck so that approximately two inches of the bristle is supported between the two chucks. The movable chuck is then moved away from the stationary chuck until the bristle breaks. The indicator of the tester reads directly the percent elongation or stretch of the bristle. The bristles selected for the test are approximately 0.008 inch in diameter. When bristles selected as controls were subjected to this test, their elongation was from 10 to 30 percent, with an average of 17 percent. The control bristles were not heated before the test. Bristles baked at 140° C. for 12 hours, thus simulating conditions used with a brush containing a rubber setting composition, had elongations of 4 to 7 percent, with an average of 5 percent. Bristles baked at 110° C. for 4 hours, simulating conditions used with a brush containing the aforesaid epoxide bonding compositions, had elongations of 10 to 27 percent, with an average of 14.5 percent. It will be seen, therefore, that the bristles baked at 140° C. for 12 hours had an average loss of 12 percent elongation, compared with only 2.5 percent average loss of those baked at 110° C. for 4 hours. These tests demonstrate the highly advantageous nature of the epoxide compositions contemplated herein and also demonstrate their superiority over the well-known rubber setting compositions.

The conversion schedules for the epoxide compositions are also superior to those necessary for phenol-formaldehyde compositions which have been used as bonding compositions. The latter require about 24 hours at 100–115° C., in contrast with 4 hours at 110° C. for the epoxide compositions.

The bonding composition—comprised of (A), (B) and (C)—may be prepared, without a catalyst, and stored at a temperature below that at which substantial polymerization occurs, at temperatures up to about 40° C., before use in a brush. As a polymerization retarder or inhibitor, various acidic materials such as organic acids may be used in small concentrations. For example, oxalic acid—either anhydrous or hydrated —will inhibit polymerization; concentrations providing satisfactory inhibition are in the neighborhood of 0.05 to 0.5 percent, particularly 0.10 percent, based on the total weight of the composition. Also, the composition may be prepared immediately prior to use following the illustrative procedures referred to above.

Bonding compositions of the character described above generally have viscosities from about 100 to about 1500 poises (at 25° C.); particularly preferred, however, are those within the range of 300–600 poises. By way of illustration, a typical composition comprised of epoxides, (A) and (B), and a dihydric phenol (C), without a catalyst, had an initial viscosity of about 300 poises; on standing for a month, the viscosity was 560 poises. As a further illustration, a composition comprised of epoxides, (A) and (B), a phenol (C), and a catalyst, may be prepared and stored for periods ranging from several hours to several days at temperatures of 20° C. or less before use as a cementing or bonding material. Such a composition may be satisfactorily stored for about six (6) hours at 20° C., or for correspondingly longer periods of time at lower temperatures.

Further details of the bonding compositions contemplated herein are provided in application Serial No. 754,079, filed June 11, 1947, of which this application is a continuation-in-part.

PLUGS OR DIVIDERS

As indicated hereinabove, and as shown in Figures 3–9, plugs or dividers 16 are used in paint brushes to properly space and secure the bristles 15 in the ferrule 11. The new and novel plugs or dividers used in making the brushes and brush assemblies contemplated herein are comprised of partially cured or completely converted epoxide-containing materials. The plugs or dividers may be made from the above-described bonding compositions or from other epoxide-containing materials. For example, a bonding composition comprising epoxides (A) and (B) and a phenol may be converted to a partially cured state with a catalyst of the type described above. Here again, a particularly outstanding divider is one obtained by converting, with about 2% by weight of KOH in a 50 percent aqueous solution, a composition comprising about 45 parts by weight of a liquid polyepoxide (A), about 40 parts by weight of a resinous epoxide (B) and about 15 parts by weight of bis phenol A. The conversion of such a composition is preferably carried out at a temperature between about 100–120° C. for 4–6 hours.

Another epoxide composition which is advantageously converted to a suitable resin plug or divider is that described in copending application Serial No. 617,176, filed September 18, 1945, by S. O. Greenlee. These epoxide resins are formed by reaction of epihalohydrins or polyhydrins with polyhydric phenols, the latter described in said application, also suitable here, are those formed by reaction of polyepoxides with polyhydric phenols. The epoxide compositions described in said application are readily converted to infusible products with converting catalysts such as described hereinabove. Still other epoxide resins and modified epoxide resins suitable for use as plugs or dividers are those described in the following copending applications of S. O. Greenlee, Serial Nos.: 617,177, filed September 18, 1945; 621,856, filed October 11, 1945; 626,449, filed November 2, 1945; 632,595, filed December 3, 1945; 653,153, through 653,156, filed March 8, 1946, 653,153 and 653,154 having matured as patents numbered 2,510,885 and 2,510,886, respectively, both dated June 6, 1950; 661,059 and 661,060, filed April 10, 1946; 681,595, filed July 5, 1946; 694,823, filed September 4, 1946; and 696,937, filed September 13, 1946, now matured as patent numbered 2,494,295 and dated Jan. 10, 1950. Reference is made herein to the foregoing copending applications for detailed descriptions of the epoxide-characterized resinous products shown therein.

The plugs or dividers may be molded in suitable shapes by resorting to well-known molding techniques. They may also be formed by casting sheets of material in shallow trays and partially or completely curing the same therein; when so cured, they may be cut or sawed into required sizes. For example, the widely used four (4) inch wall brush will generally require a plug measuring 3 7/16" long, 3/8" high and 7/16" depth.

BRISTLE

As indicated hereinabove, one element considered in the brush assembly is the bristle. Numerous materials have been used for bristle material in the brushes and brush assemblies contemplated herein. Illustrative bristle materials include natural animal bristles, particularly from hogs and horses, and synthetic filament such as casein, nylon (synthetic polyamide), vinyl chloride, vinyl chloride-acrylonitrile copolymer, vinylidene chloride, vinyon (vinyl chloride-vinyl acetate copolymer), cellulose acetate, etc., per se or textiles, such as cotton thread or yarn, coated with such synthetic materials. Illustrative processes for applying such synthetic materials are described in Patent Nos. 2,207,156, 2,207,157, 2,207,158, and in application Serial No. 490,928, filed June 15, 1943, now matured as patent numbered 2,426,896 and dated Sept. 2, 1947. Particularly preferred of such bristle materials, however, are the natural bristles, especially hog bristles. It appears that the natural bristles 15, and also synthetic bristles which contain reactive groups, enter into reaction with the bonding composition 14 to form a strong bond 14a, which is of a chemical nature rather than of a mechanical or physical nature. To improve the chemical bonding between the natural bristles and bonding composition, the butt end of the natural bristles may be modified before assembly in such a way as to increase the reactive groups present in the bristle protein. Thus thioglycolic acid will reduce the disulfide cystine present in natural bristle to cystine. The sulfhydryl group so formed reacts readily with epoxides. Chemical methods for partial degradation of protein are well known and if applied to the butt end of natural bristle will increase the activity thereof. It is not necessary, therefore, to use as long a bristle butt, as in brushes containing rubber setting compositions of the type referred to hereinabove. The conventional distance for bristle butts to be secured in the ferrule, generally referred to as "brush sizing," is three-eighths of an inch when a rubber setting composition or the like is used. With the epoxide bonding composition described above, sizing may be reduced to three sixteenths of an inch.

Still another advantage of the epoxide bonding composition is shown in the uniform distribution of the composition about the bristle butts, thus securely anchoring the bristles in the cured bonding composition.

FERRULE

The ferrule 11 used in a paint brush such as illustrated in Figure 1 may be formed from any one of a number of metals, such as steel, aluminum, magnesium, etc. In addition, it may also be formed from any one of a number of resinous or plastic materials, typical of which are phenol-formaldehyde condensates, urea-formaldehyde condensates, melamine-formaldehyde condensates, etc. A new and novel ferrule, however, is one formed from one of the epoxide compositions described above in connection with the epoxide bonding compositions and the epoxide plugs or dividers. An epoxide composition of such type may be partially cured into the desired shape and then finally cured during curing of the bonding composition in the brush. In such a brush, the ferrule fuses with the bonding composition, thus providing a unitary system comprising ferrule, bonding composition, plug and bristle. With such a unitary system, the rivets 12 generally used in a typical brush shown in Figure 1 may be omitted.

A standard type ferrule 11 is shown in Figure 5 and, while such a ferrule is satisfactory, ferrules of the type shown in Figures 6 and 7 are preferred, inasmuch as they contain the bonding composition and thus prevent the material from flowing into the bristles beyond the ferrule edge.

BRUSH MANUFACTURE

Large brushes are made by hand at the present time and I will describe the general procedure in current use to show how the epoxide compositions may be advantageously utilized in present day brush manufacture.

The brush is first formulated by mixing bristle of different type, length and thickness according to the use to which the brush will eventually be put. In a modern brush plant as much as several hundred pounds of bristles may be mixed mechanically at one time and the amount will depend upon the number of brushes to be made.

The bristle and plugs are positioned in the ferrule as shown in Fig. 6. The bristle is generally weighed out to insure the correct amount being used. Certain operators do nothing but assemble brushes, and naturally acquire a great deal of skill enabling them to work very rapidly. Smaller brushes (2" and under) may be assembled mechanically on a brush machine.

The brush assembly as shown in Fig. 6 is now ready to be flaxseeded. During this process the bristle end of the brush is dipped in an aqueous solution of flaxseed to a depth of approximately two inches. The excess flaxseed is wiped off on the edge of the dipping tank and the brush is placed in the position shown in Fig. 6 and baked for five to six hours at 125–150° F. This procedure effectively sticks the ends of the bristle together and makes subsequent handling easier.

The brush may be conveniently sized on a sizing block as shown in Fig. 9. The dimensions of the sizing block are such that it fits closely inside of the ferrule and pushes the bristle up until only 1/16" remain within the ferrule. The plugs are then set back 1/8 to 1/16" with a knife (see Fig. 9).

The sized brush is held in the position shown in Fig. 7 for pouring. Sufficient catalyzed epoxide bonding composition is poured into the ferrule to cover the plugs by approximately 1/8" (see Fig. 5) and the sized and poured brushes are carefully stacked in an upright position in a tray 3' x 1' x 6". Unless one waits 8 hours before baking, the bonding composition may flow too far into the bristle and penetration is very difficult to control. After standing overnight, the tray of brushes may be baked 100° C. for 4 hours. The ferrules are then drilled for rivets and handles fastened in place.

The correct penetration of the bonding composition into the bristle is most important and is influenced by 3 factors. They are: 1, viscosity of bonding composition; 2, epoxide equivalent of bonding composition; and 3, amount of catalyst used. Any one or all three of these variables may be adjusted as desired to give optimum penetration, the amount of potassium hydroxide being the most critical factor. It has been found advantageous to use a bonding composition having an epoxide equivalent in the neighborhood of 270, and a viscosity in the range of 390–410 poise with from 2 to 4 percent potassium hydroxide catalyst. However, these factors may vary widely depending upon the formulation of the brush, size of the brush, and the amount of penetration desired. The optimum amount of potassium hydroxide to be used for any run is first determined on a few sample brushes. It is a further advantage of this invention that penetration can be nicely controlled.

The hemmed ferrule, 19 in Fig. 6, and the hemmed and rolled ferrule, 20 in Fig. 7, give greater control of the flow of the bonding composition than the standard beaded ferrule. The hemmed ferrule 19 is to be preferred over the hemmed and rolled ferrule 20 which distorts the bristle.

The brush assemblies in ferrules such as shown in Figs. 5 to 7 may be further strengthened by using metal strips and the like in the bonding compositions as shown in Patent No. 2,190,182, issued February 13, 1940, to W. C. Beames.

BRUSH HANDLE

Any one of a number of materials may be used in forming the brush handle 10. Typical materials are wood, metal (aluminum, magnesium, etc.), and resins or plastics (cured urea-formaldehyde, phenol - formaldehyde condensates, etc.).

The brush handle may also advantageously be formed from a cured or a converted epoxide composition such as described hereinabove. The latter provides a most advantageous handle in that it will fuse with an epoxide resin used for the bonding composition. By using an epoxide resin handle and the same or similar epoxide resin for the bonding composition and plugs or dividers, an unusually strong brush is realized. Such a brush will be comprised of bristles, an epoxide bonding composition and epoxide plugs; in such a brush, there is no need for a ferrule. Such a brush may be advantageously formed by preparing an epoxide handle having a cavity or recess at the brush end to receive an assembly of bristles and epoxide plugs. The epoxide handle used is preferably only partially converted or cured.

When such a brush handle is used, the brush is sized as described above, the metal ferrule 11 is backed off toward the tip of the bristles, as illustrated in Fig. 8, sufficient catalyzed bonding composition is poured into the handle cavity to anchor the bristle and plugs which are inserted as shown in Fig. 8, and clamped in position until the bond has hardened. Heat is then applied to convert the bonding composition, whereupon a firm bond is obtained with the epoxide handle and epoxide plugs. The metal ferrule may then be removed and may in fact be used repeatedly for the same purpose.

When the bristles used are of natural material such as hog bristle, all of the elements of the brush appear to be firmly bonded chemically, rather than physically or mechanically as in brushes hitherto available.

ILLUSTRATIVE EXAMPLES

The following examples are provided to illustrate the invention, and are not to be construed as limitations. The examples illustrate the individual components which cooperate to provide the final compositions, procedures for preparing the same and the final compositions. In the examples, and in the appended claims, all parts are by weight unless otherwise indicated.

I. *Complex liquid polyepoxide (A): I*

A complex liquid polyepoxide was prepared by reacting one mol of glycerin with substantially three mols of epichlorhydrin, followed by dehydrohalogenation, according to the following procedure:

In a reaction vessel provided with a mechanical stirrer and external cooling means was placed a quantity of 276 parts of glycerol and 828 parts of epichlorhydrin, and to this reaction mixture was added one part of 45% boron trifluoride ether solution diluted with nine (9) parts of ether. The reaction mixture was agitated continuously, the temperature rising to 50° C. during a period of one hour and 44 minutes, at which time external cooling with ice water was applied. The temperature of the reaction mixture was maintained between 49° C. and 77° C. for one hour and 21 minutes.

To 370 parts of the product formed from glycerol and epichlorhydrin, was added 900 parts of dioxane and 300 parts of powdered sodium aluminate ($Na_2Al_2O_4$), in a reaction vessel provided with a mechanical agitator and a reflux condenser. The reaction mixture thus formed was continuously agitated and gradually heated to 93° C. during a period of one hour and 51 minutes. The temperature was held at 93° C. for a period of eight hours and 49 minutes. The reaction mixture was then cooled to room temperature (20–25° C.) and the inorganic material, such as sodium chloride and aluminate oxide, was removed by filtration of the cooled mixture. Dioxane and low boiling products were removed by heating the filtrate to 205° C. at 29 mms. pressure, whereupon 261 parts of a pale yellow product was obtained as a residue. This product had a viscosity of C-E (Gardner-Holdt Scale) and, therefore, a softening point (Durran's Mercury Method) substantially below 20° C. The product had an equivalent weight to epoxide of 149. The product is identified hereinafter as liquid polyepoxide I.

II. Complex liquid polyepoxide (A): II

In a reaction vessel fitted with a thermometer, reflux condenser, gas inlet tube and electrically-driven stirrer, were placed 272 grams of powdered pentaerythritol, 124 grams (2 mols) of ethylene glycol and 6 ccs. of a BF₃-ethyl solution (45% BF₃). The reaction mixture thus formed was heated to about 135° C., whereupon ethylene oxide was introduced therein through the gas inlet tube. The mixture was then heated at 130–138° C. for 1 hour and 18 minutes. Ethylene oxide addition was discontinued and 136 grams of pentaerythritol (total used, 402 grams; 3 mols) were added to the reaction mixture. Following addition of pentaerythritol, the mixture was heated at 125–130° C. for 50 minutes. Ethylene oxide was then introduced through the gas inlet tube, for 3 hours at 125–170° C. The total quantity of ethylene oxide so introduced was 202 grams (4.6 mols).

The resulting mixture was transferred to a reaction vessel, fitted with thermometer, reflux condenser and electrically-driven stirrer, and heated to 120° C. Six (6) ccs. of the BF₃-ethyl ether solution were added. Epichlorhydrin (1570 grams; 17 mols) was then added during a period of 2 hours and 25 minutes, during which period the temperature varied from 97° C. to 118° C.

A quantity, 231 grams, of the epichlorhydrin reaction product so obtained was placed in a reaction vessel equipped with a thermometer, reflux condenser and electrically-driven stirrer. Three hundred (300) ccs. of dioxane, 20 ccs. of water, and 170 grams of sodium aluminate (Na₂Al₂O₄) were added. The reaction mixture thus formed was continuously agitated and heated at about 96° C. for 3 hours. The reaction mixture was treated as described in Example I above, except that the vacuum distillation was continued to 200° C. at 3 mms. pressure. The product, 159 grams, was a clear, very pale yellow liquid, having a viscosity of H (G.-H. Scale). The product also had an epoxide equivalent of 161 and an average molecular weight of 360 (determined by standard freezing point method with benzophenone); this corresponds to an average of about 2.2 epoxide groups per molecule. The product is identified herein as liquid polyepoxide II.

III. Complex liquid polyepoxide (A): III

In a three-liter, three-neck glass reaction flask, equipped with a thermometer, dropping funnel and an electrically-driven stirrer, were placed 552 grams (6 mols) of glycerol and 5 ccs. of an ethyl ether solution of BF₃ (45% BF₃). The mixture was agitated and heated to 65° C., whereupon heating was discontinued. Epichlorhydrin was then added gradually through the dropping funnel to the mixture, at such a rate that the temperature varied from 70–90° C. with external cooling being applied to the flask. The epichlorhydrin, 1665 grams (18 mols) was added during a period of 1 hour and 49 minutes. The reaction mixture was stirred for another hour, without further cooling; during this period the temperature was 60–87° C. The substantially colorless liquid product so obtained had a viscosity of Z₄.

A quantity, 186 grams, of the glycerol-epichlorhydrin condensate so prepared, 20 grams of water and 300 ccs. of dioxane were placed in a one-liter, three-neck glass flask equipped with a thermometer, reflux condenser and electrically-driven stirrer. The dioxane solution so formed was agitated and 80 grams of finely powdered anhydrous sodium ortho silicate (Na₄SiO₄; 60 mesh) were added thereto. The resulting mixture was refluxed at 93° C. for ½ hour. The mixture was then cooled and filtered as described above in Example I. The filtrate and dioxane washings were combined and vacuum distilled. The product, 139 grams, had an epoxide equivalent of 139; a molecular weight of 295, thus corresponding to an average of 2.1 epoxide groups per molecule; a viscosity of D+; and a chlorine content of 6.4 percent. The product is referred to hereinafter as liquid polyepoxide III.

IV. Complex liquid polyepoxide (A): IV

An epichlorhydrin-glycerol condensate, 186 grams, prepared as described in Example I above, was dissolved in 300 ccs. of dioxane and treated with 90 grams of sodium zincate (30% ZnO), in the manner described in Example III above. The reaction mixture was heated at 70° C. for ½ hour, then cooled and filtered as described in Example I. The filtrate and dioxane washings were combined and vacuum distilled. The product, 134 grams, had an epoxide equivalent of 143; a viscosity of D; and a chlorine content of 8.9 percent. This product is identified herein as liquid polyepoxide IV.

V. Resinous epoxide (B)

Bis phenol A (798 parts) was dissolved in a caustic soda solution made by dissolving 200 parts of caustic soda in 1730 parts of water, in a stainless steel closed-kettle. Epichlorhydrin (650 parts) was added in one portion to the closed kettle. The kettle was provided with a stirrer and the mixture was stirred during the process. The temperature rose from about 37° C. to about 70° C. in about 45 minutes. Caustic soda, 80 parts in 200 parts of water, was then added, whereupon the temperature rose to about 82° C. during the course of about 30 minutes. Additional caustic soda, 29 parts in 100 parts of water, was then added and the kettle was heated. The temperature of the reaction mixture was gradually increased to about 95° C. in about 30 minutes. The aqueous liquor was drawn off from the taffy-like product which had formed. The latter was washed with hot water, while agitated, and a series of four washing treatments with fresh water was applied until the product was neutral to litmus. The product was then dried by heating to a final temperature of 130° C., and removed from the kettle to suitable containers. The product is referred to hereinafter as resinous epoxide I.

In this example, two mols of epichlorhydrin are used with one mol of bis phenol A, with an amount of caustic soda somewhat in excess of two mols. The softening point of the resinous epoxide, determined by Durrán's Mercury Method, was 43° C. The product had an epoxide equivalent of 325.

VI. Epoxide composition (A), (B) and (C)

A particularly outstanding bonding composition is one comprised of the following:

| | Parts by weight |
|---|---|
| Liquid polyepoxide I | 45 |
| Resinous epoxide I | 40 |
| Bis phenol A | 15 |
| Oxalic acid (anhydrous) | 0.1 |

The composition is advantageously formed by adding bis phenol A to the liquid polyepoxide (I), while agitating and heating the same at 50–60° C. for about three hours, or until the bis phenol A has dissolved. The oxalic acid is added to the bis phenol A-polyepoxide I mixture. Then, the resinous epoxide I is melted and added to the bis phenol A-liquid polyepoxide I mixture, while agitating and heating the latter at 50–60° C. for about ½ hour. The composition is stable, little or no increase in viscosity taking place during a two month storage period.

This composition converts to a water-insoluble, infusible product when a suitable converting catalyst is used therewith. For example, about 2% (by weight) of KOH, in a 50% aqueous solution, is thoroughly admixed with the composition at about 150° C., and the resulting mixture is immediately poured into the ferrule of a brush assembly as described above. This composition will solidify in less than 4 hours at 25° C.; and within 8 to 16 hours after pouring the entire brush assembly may be baked.

If it is desired to prepare brush plugs from the above catalyst containing composition, a casting may be made and allowed to stand at room temperature until solid. The solid, when heated to about 100–120° C. for 4–6 hours, forms an excellent infusible product.

If sufficient time elapsed before baking, the infusible product is uniform in character; not characterized by voids or bubbles from entrapped volatile material, as is the case with many infusible materials. The high degree of solvent resistance of the product is demonstrated by tests with various solvents. A rod-shaped portion of the product was totally immersed in a solvent for seven days at a temperature of about 25° C. Each rod was measured before immersion and following the seven day test period. Solvents used were water, alcohol, acetone and benzene. After seven days, the volumetric swelling or increase in volume of each test rod was: with water, 1.80%; with alcohol, 1.86%; with acetone, 5.2%; and with benzene, 0.8%.

In contrast with this infusible product are wooden plugs or dividers commonly used heretofore in paint brushes. Wooden plugs, formed from sycamore, were immersed in water and in alcohol under the same conditions as plugs formed from the aforesaid infusible product. At the end of the test period (7 days), the sycamore plugs or dividers had increased in volume 220 percent more than had the epoxide plugs, when immersed in water; and 270 percent more when immersed in alcohol.

VII. *Epoxide composition—brush plug*

798 parts of bis phenol were dissolved in a caustic soda solution made by dissolving 200 parts of caustic soda in 1730 parts of water in a stainless steel kettle, and 650 parts of epichlorhydrin were added to the closed kettle. The kettle was provided with a stirrer and the mixture was stirred during the process. The temperature rose from around 370° C. to around 70° C. in about 45 minutes. 80 parts of caustic soda in 200 parts of water were then added with further increase in temperature to about 82° C. in about one-half hour. 29 parts of caustic soda in 100 parts of water were then added and the kettle was heated to raise the temperature gradually to about 95° C. in about one hour. The aqueous liquor was then drawn off and hot wash water applied with agitation, and a series of four washing treatments with fresh water was applied until the product became neutral to litmus. The product was then dried by heating to a final temperature of 130° C., and drawn from the kettle.

In the above example 2 mols of epichlorhydrin are used for 1 mol of bis phenol with an amount of caustic soda somewhat in excess of 2 mols. The softening point of the resulting resinous product determined by Durran's Mercury Method was 43° C. The approximate molecular weight determined by a standard boiling point elevation method was about 451. The determination of the epoxide groups in the product showed an equivalent weight of 325 per epoxide group which would represent approximately 1.4 epoxy groups per molecule of the average molecular weight indicated. The equivalent weight to esterification was 84.5. The epoxide group content of the product was determined by the procedure described above.

The equivalent weight to esterification was determined by heating the product with about twice the theoretical amount of linseed oil acids necessary to react with all of the hydroxyl and epoxy groups at 228° C. until a constant acid value was obtained and by back titrating the unreacted linseed acids and calculating the hydroxyl plus epoxy content from such acid values, one epoxide group being equivalent to two hydroxyl groups in this test. In view of the possibility or probability that some polymerization takes place during this high temperature esterification the results can only be considered an approximation of the total hydroxyl plus epoxy groups esterified.

The resin was melted and treated with 5% of its weight of sodium phenoxide. This mixture was heated for 30 minutes at 150° C. to give a hard, tough, infusible product. This resin is described in detail in the aforesaid copending application, Serial No. 621,856, of S. O. Greenlee.

TYPES OF BRUSHES

While the invention has been described herein above in connection with paint brushes and brush assemblies therefor, it is to be understood that the invention is not to be limited thereto. Rather, the epoxide bonding composition may be used in brushes of other types; so also, may the epoxide plugs or dividers, epoxide ferrules and handles. Brushes in contact with water, organic solvents, etc. are particularly improved by the aforesaid epoxide elements. Examples of such brushes are household brushes as floor brushes, toilet brushes, shaving brushes, dental brushes, industrial brushes such as buffing brushes, shoe brushes, and the like.

It is to be understood that the illustrations provided hereinabove serve to typify the invention and are not to be considered as limitations thereof; rather, the invention is to be broadly construed in the light of the language of the appended claims.

I claim:

1. In the manufacture of brushes with bristles, the improvement which comprises applying to the ends of the bristles a bonding composition reactive with the surfaces of said bristles and containing (A) an aliphatic polyepoxide with a plurality of epoxide groups and free from functional groups other than alcoholic hydroxyl and epoxide groups and having a softening point below about 40° C., (B) a resinous ether epoxide having a softening point not greater than about 65° C. prepared by reaction of about 2 mols of epichlorhydrin and of alkali with 1 mol of a polyhydric phenol free from functional groups other than phenolic hydroxyl groups, and (C) a phenol free from functional groups other than phenolic hydroxyl groups, in the proportions of about 1/10 to about 1/5 part of the phenol (C) to 1 part of epoxides (polyepoxide (A) plus resinous epoxide (B)), and the polyepoxide and resinous epoxide being in the proportions of 1 part of polyepoxide (A) to from about 2/3 part to about 3 parts of resinous epoxide (B), and causing said bonding composition to react to convert the same into an insoluble, infusible chemical bond with the bristles.

2. The process according to claim 1 in which the phenol (C) is a dihydric phenol.

3. The process according to claim 1 in which the phenol (C) is a dihydric phenol and the aliphatic polyepoxide (A) has a softening point of about 20° C.

4. The process according to claim 1 in which the phenol (C) is a dihydric phenol and the aliphatic polyepoxide (A) is a polyglycidether derivative of a polyhydric alcohol containing at least three hydroxyl groups resulting from the reaction in a substantially non-aqueous medium of a polychlorhydrin ether of the alcohol with a basic reacting composition selected from the group consisting of an alkali metal aluminate, an alkali metal silicate and an alkali metal zincate.

5. The process according to claim 1 in which the phenol (C) is predominantly 4-4'-dihydroxy-diphenyl dimethyl methane and in which the resinous epoxide (B) is prepared by reacting the same dihydric phenol with epichlorhydrin and alkali.

6. In the manufacture of brushes with bristles, the improvement which comprises applying to the ends of the bristles a bonding composition reactive with the surfaces of said bristles and containing (A) a liquid aliphatic polyepoxide with a plurality of epoxide groups and free from functional groups other than alcoholic hydroxyl and epoxide groups, (B) a resinous ether epoxide having a softening point not greater than about 65° C., prepared by reaction of about 2 mols of epichlorhydrin and of alkali with 1 mol of bis-phenol A (predominantly 4-4'-dihydroxy-diphenyl dimethyl methane), and (C) bis-phenol A, in the proportions of about 1/10 to about 1/5 part of bis-phenol A to 1 part of epoxides (polyepoxide (A) plus resinous epoxide (B)) and the polyepoxide and resinous epoxide being in the proportions of 1 part of polyepoxide (A) to from about 2/3 part to about 3 parts of resinous epoxide (B) and causing said bonding composition to react to convert the same into an insoluble, infusible chemical bond with the bristles.

7. In the manufacture of brushes with bristles, the improvement which comprises applying to the ends of the bristles a bonding composition reactive with the surfaces of said bristles and containing (A) a complex aliphatic polyepoxide with a plurality of epoxide groups and free from functional groups other than alcoholic hydroxyl and epoxide groups and having a softening point below about 40° C., said polyepoxide being a polyglycide ether of a polyhydric alcohol resulting from the reaction of said alcohol with an excess of epichlorhydrin to form a complex polychlorhydrin ether of the alcohol and reaction in a substantially non-aqueous medium of said complex polychlorhydrin ether with a basic reacting composition selected from the group consisting of an alkali metal aluminate, an alkali metal silicate, and an alkali metal zincate, (B) a resinous ether epoxide having a softening point not greater than about 65° C., prepared by reaction of about 2 mols of epichlorhydrin and of alkali with 1 mol of bis-phenol A (predominantly 4-4'-dihydroxy-diphenyl dimethyl methane), and (C) bis-phenol A, in the proportions of about 1/10 to about 1/5 part of bis-phenol A to 1 part of epoxides (polyepoxide (A) plus resinous epoxide (B)) and the polyepoxide and resinous epoxide being in the proportions of 1 part of polyepoxide (A) to from about 2/3 part to about 3 parts of resinous epoxide (B), and causing said bonding composition to react to convert the same into an insoluble, infusible chemical bond with the bristles.

8. In the manufacture of brushes with bristles, the improvement which comprises applying to the ends of the bristles a bonding composition reactive with the surfaces of said bristles and containing (A) an aliphatic polyepoxide with a plurality of epoxide groups and free from functional groups other than alcoholic hydroxyl and epoxide groups, said polyepoxide being a complex polyglycol ether of glycerol resulting from the reaction of glycerol with epichlorhydrin in the proportions of about 1 mol of epichlorhydrin to each hydroxyl group of the glycerin to form a polychlorhydrin ether, and reaction of said polychlorhydrin ether in a substantially non-aqueous medium with a basic reaction composition selected from the group consisting of an alkali metal aluminate, an alkali metal silicate and an alkali metal zincate, (B) a resinous ether epoxide having a softening point not greater than about 65° C., prepared by reaction of about 2 mols of epichlorhydrin and of alkali with 1 mol of bis-phenol A (predominantly 4-4'-dihydroxy-diphenyl dimethyl methane), and (C) bis-phenol A, in the proportions of about 45 parts of the polyepoxide (A), about 40 parts of resinous epoxide (B) and about 15 parts of bis-phenol A, and causing said bonding composition to react to convert the same into an insoluble, infusible chemical bond with the bristles.

9. A paint brush manufactured in accordance with the process of claim 1.

10. A paint brush manufactured in accordance with the process of claim 6.

11. A paint brush manufactured in accordance with the process of claim 7.

12. A paint brush manufactured in accordance with the process of claim 8.

13. A paint brush manufactured in accordance with the process of claim 1 and having plugs separating the bristles and bonded with the same bonding composition, said plugs being resinous epoxide plugs resulting from the reaction of the bonding composition of claim 1.

14. An integral paint brush manufactured in accordance with the process of claim 1 and having an epoxide resin handle bonded to the bonding composition, said epoxide resin handle being made of an epoxide resin resulting from the reaction of the bonding composition of claim 1.

15. A paint brush manufactured in accordance with the process of claim 1 in which only approximately 1/16" of the back ends of the bristles extend up into the ferrule and are bonded by the bonding composition of claim 1.

16. A paint brush manufactured in accordance with the process of claim 6 in which only approximately 1/16" of the back ends of the bristles extend up into the ferrule and are bonded by the bonding composition of claim 6.

17. A paint brush manufactured in accordance with the process of claim 7 in which only approximately 1/16" of the back ends of the bristles extend up into the ferrule and are bonded by the bonding composition of claim 7.

18. A paint brush manufactured in accordance with the process of claim 8 in which only approximately 1/16" of the back ends of the bristles extend up into the ferrule and are bonded by the bonding composition of claim 8.

CARL E. BIXLER.

REFERENCES CITED

The following references are of record in the file of this patent:

UNITED STATES PATENTS

| Number | Name | Date |
| --- | --- | --- |
| 1,906,426 | Semon | May 2, 1933 |
| 2,324,483 | Castan | July 20, 1943 |
| 2,406,732 | Hardman | Aug. 27, 1946 |
| 2,408,718 | Haux | Oct. 1, 1946 |
| 2,443,055 | Reis | June 8, 1948 |

FOREIGN PATENTS

| Number | Country | Date |
| --- | --- | --- |
| 317,770 | Great Britain | Aug. 19, 1929 |